United States Patent [19]

Dürrenberger

[11] Patent Number: 4,685,444
[45] Date of Patent: Aug. 11, 1987

[54] PROCESS AND EQUIPMENT FOR HEATING A LIQUID WITHOUT POLLUTION OF THE ENVIRONMENT

[76] Inventor: Willy Dürrenberger, Augsterstrasse 21, CH-4133 Pratteln, Switzerland

[21] Appl. No.: 694,461

[22] Filed: Jan. 24, 1985

[30] Foreign Application Priority Data

Feb. 8, 1984 [CH] Switzerland .......................... 627/84
Apr. 19, 1984 [CH] Switzerland ........................ 1960/84

[51] Int. Cl.$^4$ .............................................. F24H 1/20
[52] U.S. Cl. ............................ 126/360 A; 122/5.5 A; 122/14; 122/31 A
[58] Field of Search .................. 126/360 R, 360 A; 261/93; 60/39.57; 110/215; 122/31 A, 5.5 A, 182 R, 14

[56] References Cited

U.S. PATENT DOCUMENTS

| | | | |
|---|---|---|---|
| 1,765,338 | 6/1930 | Jones et al. ............................ | 210/26 |
| 1,921,220 | 8/1933 | Daman .................................. | 261/93 |
| 2,177,665 | 10/1939 | Loughrey ............................. | 202/30 |
| 2,333,497 | 11/1943 | Velander ......................... | 60/39.57 X |
| 2,878,644 | 3/1959 | Fenn ................................... | 60/39.57 |
| 2,902,029 | 9/1959 | Hill .................................. | 126/360 A |
| 3,278,170 | 10/1966 | Moritz ................................. | 261/29 |
| 3,438,722 | 4/1969 | Herédy et al. .................. | 110/215 X |
| 3,568,658 | 3/1971 | Brock .............................. | 126/360 A |
| 3,647,358 | 3/1972 | Greenberg .......................... | 23/2 R |
| 3,756,171 | 9/1973 | DeBord .............................. | 110/215 |
| 3,984,001 | 10/1976 | Nagano et al. ........................ | 209/3 |
| 4,444,128 | 4/1984 | Monro .............................. | 110/345 |

FOREIGN PATENT DOCUMENTS

| | | | |
|---|---|---|---|
| 56-34017 | 4/1981 | Japan ................................. | 110/215 |
| 57-14143 | 1/1982 | Japan ............................. | 126/360 A |

*Primary Examiner*—Samuel Scott
*Assistant Examiner*—Allen J. Flanigan
*Attorney, Agent, or Firm*—Pennie & Edmonds

[57] ABSTRACT

The lower section (9a) of a flame tube (9), in which a burner (11) generates a flame (F), protrudes into the water contents (W), which contains an absorbent, of a water tank (1). The hot combustion gases are drawn into the water and set in turbulent motion by means of a rotor (12), whereby a long residence time and large contact areas result. The purified gases leave the water tank (1) through an outlet (18). The heat generated within the water contents (W) is removed through a tube coil (6) through which a liquid flows. The equipment is uncomplicated and inexpensive, and ensures excellent efficiency. The escaping waste gases no longer contain any detectable pollutant residues.

12 Claims, 2 Drawing Figures

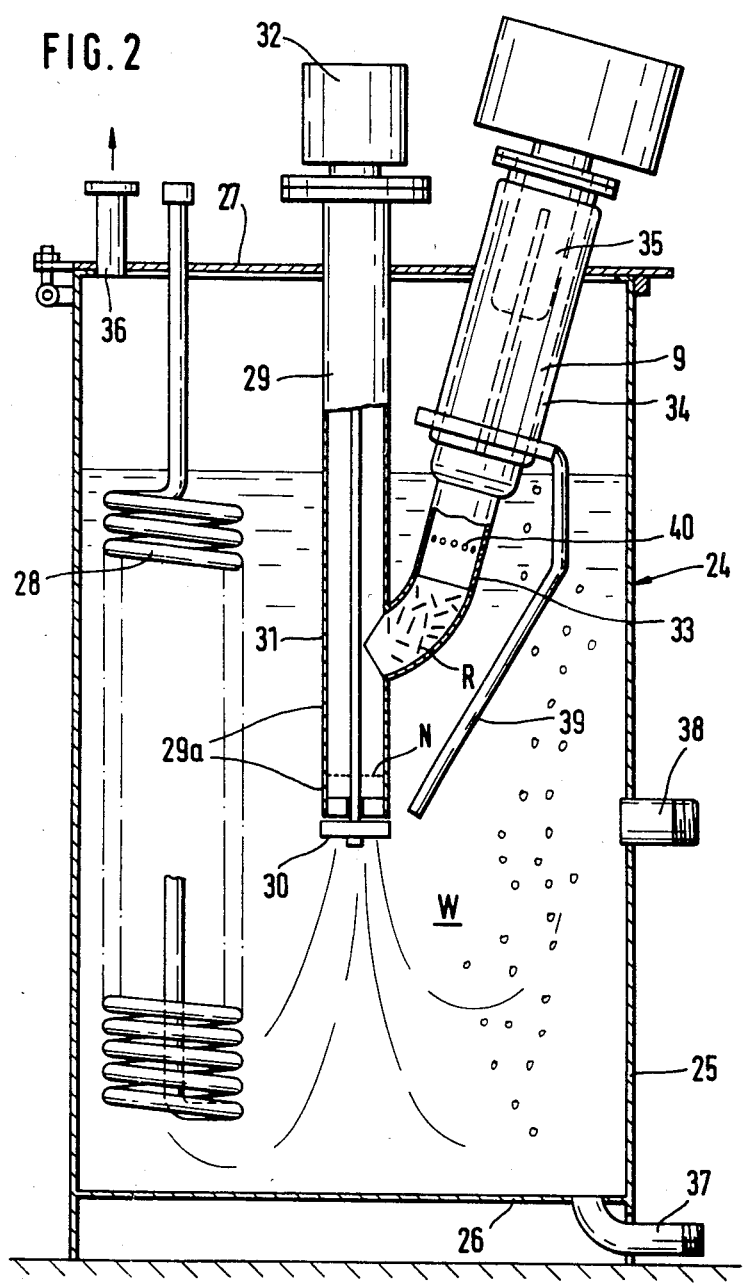

PROCESS AND EQUIPMENT FOR HEATING A LIQUID WITHOUT POLLUTION OF THE ENVIRONMENT

The invention relates to a process for heating a liquid while avoiding the discharge of pollutants into the environment, the liquid being heated by direct contact with hot gases. It also relates to equipment used for carrying out this process and comprising a tank containing a liquid, a hot-gas tube arranged within the tank and an outflow opening, provided on the tank, for the combustion gases.

All processes for the generation of heat from liquid, solid or gaseous fuels share the disadvantage of discharging pollutants into the environment. These problems cause incalculable losses and damage in nature. This damage is generally known and does not need any more detailed explanation.

U.S. Pat. No. 3,568,658 describes a water-heating system, according to which a two-part flame tube is arranged within the water contents of a tank. A burner is arranged in such a way that the major part of the flame is immersed in the water contents of the flame tube. The combustion gases thus arising in the water contents of the flame tube are pumped out with the water at the lower part of the tube and passed to the tank contents. Units of this type are, on the one hand, relatively complicated, since the flame tube must be made in two parts and, moreover, must be connected to a pump system. The immersion of the flame in the water contents of the flame tube results in a considerably lower efficiency of the unit, in particular since the water contents of the tank can be heated here in small quantities (flame tube contents) each time. The absorption of pollutants is negligibly small, since the residence time of the waste gas bubbles in the tank contents is relatively short and there is no turbulence within the tank contents.

According to British Pat. No. 759,062, the flame temperature within a flame tube completely surrounded by liquid is to be controlled by introducing a coolant and/or chemical reagents. In order to avoid local overheating, the flame tube is surrounded by a cooling jacket, through which cool gas is introduced into the flame zone, and this is said to have proved its worth in particular in the treatment of sugar solutions and for exerting an influence on chemical reactions (sulfur oxidation and the like). Here also, the point is not the absorption of pollutants, but the oxidation of chemicals, and the flame gases are generated within the liquid which is to be heated, and are passed passively without turbulence through the tank contents.

It is the object of the present invention to avoid the disadvantages of the known units and, in particular, to propose a process which ensures absorption of pollutants from the hot gases and which achieves a long residence time of the hot gases in the liquid, which is to be heated, and hence a better efficiency, the equipment used for carrying out this process being intended to be constructionally simple and hence to be realizable at low cost.

The process according to the invention and the equipment are defined in claims 1 to 9. In one embodiment of the equipment according to the invention, the hot gases are generated, for example, by a burner flame. The absorption liquid is preferably water, and absorbents can have been added to the water.

The preferred absorbents are bases, in particular bases such as, for example, alkaline earth metal hydroxides or alkali metal hydroxides, or the hydroxides of trivalent metals. Depending on the nature of the absorbent liquid, salts can also be incorporated in the absorbent liquid as neutralizing agents for the pollutants contained in the flame gases. Advantageously, those salts are used which exert a buffer action, such as, for example, primary, secondary or tertiary alkali metal phosphates. Particularly preferred salts are sodium dihydrogen phosphate, disodium hydrogen phosphate, trisodium phosphate or carbonates such as, for example, calcium carbonate or sodium carbonate.

Correspondingly, pollutants of a basic nature are also evolved in combustion installations. In order to absorb these, weak acids are advantageously added to the absorbent liquid.

Examples of preferred acids are phosphoric acid or dilute sulfuric acid. The tube dipping into the absorbent liquid is preferably insulated, so that virtually no waste heat is released to the surroundings. The tube preferably consists of a heat-resistant and corrosion-resistant material. The shaping of the tube is of subordinate importance, but a cylindrical shape is preferred.

In order to ensure optimum introduction of the flame gases with turbulence into the absorbent liquid, homogenizers, vibrators or ultrasound can be used in place of a rotor for the equipment according to the invention. The important point is that the flame gases are introduced in the form of bubbles with turbulence into the absorbent liquid and, in a preferred embodiment, the largest possible bubbles are desirable for a relatively short residence time, and smaller bubbles are desirable for a longer residence time in the absorbent liquid, and larger bubbles are desirable for a longer residence time in the absorbent liquid. The object is to ensure optimum heat exchange and maximum absorption of pollutants. Gas introduction devices which represent the optimum with respect to bubble size and residence time are known in the state of the art. The control of the bubble size can, for example, be regulated by fitting a net. A further possibility of influencing the bubble size is the addition of a wetting agent to the absorbent liquid, this being preferred in an acid medium. In a particularly preferred embodiment, the hot flame gases are pre-cooled with a sufficiently large quantity of absorbent liquid, preferably to a temperature which is below the boiling point of the absorbent liquid, in order to minimize the gas volume which is to be introduced with turbulence. This is effected, for example, by parts which increase the surface area, such as, for example, Raschig rings, which are fitted between the flame and the rotor. Overall this results in a lower energy requirement for the rotor, for example for the device selected for the turbulent introduction.

The absorbent liquid as an energy carrier can release its heat to a secondary energy carrier, and this is of particular importance for space heating, heating of service water or heat recovery from industrial waste gases.

The equipment according to the invention is suitable for the absorption of flame gases at usual temperatures, but the low-temperature range is preferred. In the low-temperature range, the standstill losses are smaller and virtually negligible when the equipment according to the invention is used.

Summarizing, it can be stated that the equipment according to the invention enables liquid, liquefied and gaseous fuel materials to be burned without releasing pollutants, and in particular under heat utilization, which is as near as possible to the optimum, and at a considerably lower fuel consumption than that applying in known equipment, and the non-polluting disposal of the combustion residues, together with the fact that pollution of the environment is avoided, must be mentioned as particular advantages.

In addition to the simple construction, a further essential advantage is the fact that a stack in the conventional sense is unnecessary. The process according to the invention is expediently carrier out in such a way that burner flame gases of usual temperature, preferably between 50° C. and 2000° C., particularly preferably between 800° C. and 1500° C., and very particularly preferably from 1000° C. to 1500° C., that is to say flame gases and/or industrial waste gases at these temperatures, are introduced with turbulence in the form of bubbles into the absorbent liquid through a tube by means of an homogenizer, vibrator or rotor, the homogenizer, vibrator or rotor propeller being of such dimensions that a slightly reduced pressure is generated in the tube when the equipment is in operation. In one embodiment of the process according to the invention, the absorbent liquid is set in rotary motion, by means of a rotor, for the turbulent introduction of the flame gases into the absorbent liquid, with the advantage that a longer residence time of the bubbles rising on a spiral path and optimum pollutant absorption are thus achieved.

The equipment according to the invention is explained in more detail below by reference to the attached drawings, the figures describing only two of the possible embodiments in greater detail. It is within the scope of those skilled in the art to develop further embodiments based on the inventive concept presented, such as, for example, the use as equipment for heat recovery with simultaneous purification of waste gases.

FIG. 2 shows an embodiment variant, likewise in section.

Figure 1:
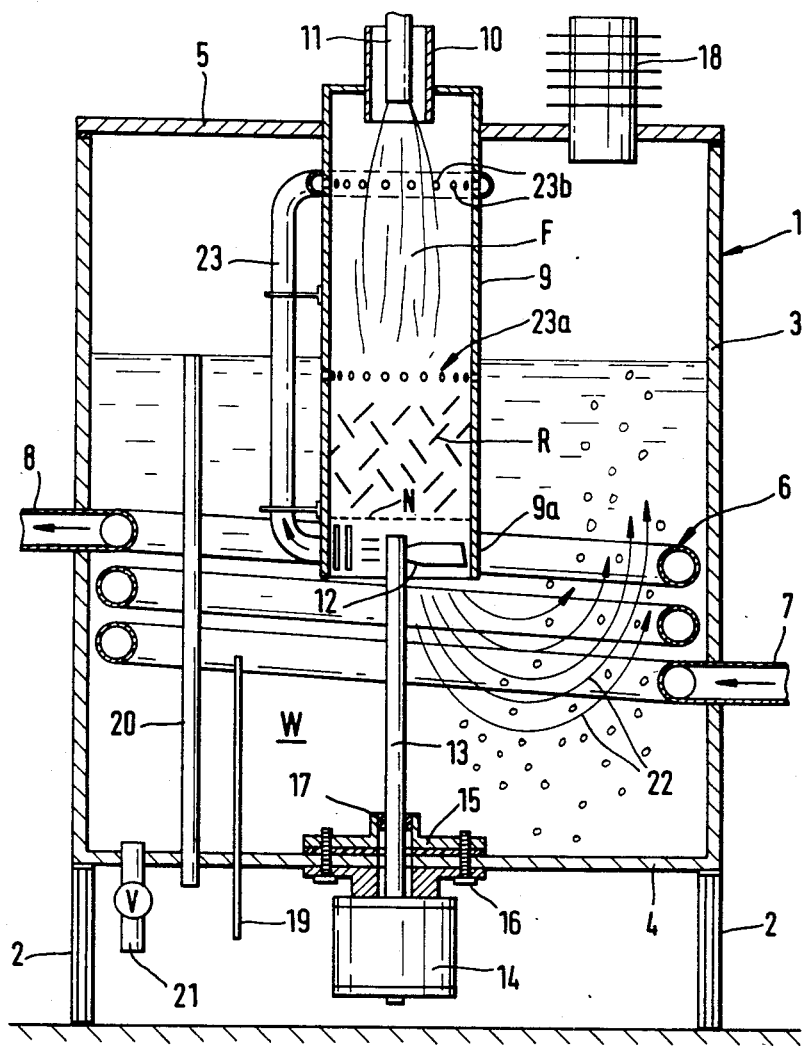
FIG. 1 is a diagrammatic sectional representation of such equipment.

According to the embodiment shown in FIG. 1, the equipment comprises a liquid-tight housing 1 which is supported on the floor by feet 2. The housing 1 is composed of a circular-cylindrical shell 3, a bottom 4 and a cover 5. It is partially filled with a liquid, for example water W containing an absorbent. Inside the water contents W, there is the tube coil 6 which serves as heat exchanger and is connected via an inlet 7 and an outlet 8 to a heat consumer, for example a heating installation. The medium entering the tube coil 6 at the inlet 7 is heated up inside the tube coil 6 and releases its heat outside the equipment to the heat consumer.

In the cover 5 of the housing 1, a cylindrical tube 9 is suspended, and a further tube 10 of smaller diameter leads into the upper part thereof. A burner 11 connected to a known burner system is arranged in the latter tube. The tube 9 which is preferably made of stainless steel protrudes downward into the interior of the housing 1 for such a distance that its lower section 9a dips into the water contents W. Within this lower tube section 9a, a rotor 12 is arranged which is thus located within the water contents W and is connected via the drive shaft 13 to a motor 14. The motor 14 is flanged to the housing bottom 4 via flanges 15 and bolts 16, and the shaft 13 passes through the bottom 4 by means of a liquid-tight seal 17.

Moreover, a waste air duct 18 is fitted in the cover 5 of the housing 1. A thermostat 19 and an overflow tube 20 project from below into the water contents W. A draw-off cock 21 which is connected via a line to a filter unit is provided at the housing bottom 4.

When the equipment described is in operation, the burner 11 produces a flame F inside the tube 9, the burner adjustment and the tube length being matched such that the flame does not reach the water level and also is not disturbed by water particles splashing about. Owing to the action of the rotor 12 revolving in the water, suction is generated at the interface between the water and the tube interior, by means of which suction the combustion gases being produced in the tube 9 are drawn into the water and hurled downward in the form of bubbles into the water contents W, whereupon they slowly rise upward in the direction of the arrows 22. This turbulent motion, effected by the rotor 12, of the combustion gases in the water results in a long residence time and also in large contact areas between the gas bubbles and the surrounding water.

Precooling of the flame gases can be effected by means of a tube 23 (FIG. 1) or 39 (FIG. 2), which rises starting from the vicinity of the propeller 12 and surrounds the combustion chamber 9 (FIG. 1). In the surrounding part of the tube 23 (FIG. 1), there are small orifices 23b, so that the absorbent liquid is finely distributed across the entire chamber and continuously wets and cools the entire outer wall thereof. As soon as the propeller 12 runs, the level of the absorbent liquid rises in the tank at least up to the bores 23a (FIG. 1) or 40 (FIG. 2) and wets the surface area-enlarging parts R (FIGS. 1 and 2), whereby an additional cooling effect is achieved; it should be the aim to cool the hot gases to a temperature which is below the boiling point of the absorbent liquid.

In the embodiment illustrated in FIG. 2, the tube 39 rising from the propeller ends in a double jacket 34, whereby a flow around the combustion chamber 9 is effected. This aspect prevents overheating of the gases present in the combustion chamber 9 above the level of the absorbent liquid.

The surface area-enlarging parts R (Raschig rings) are used in the same way as described in FIG. 1.

FIG. 2 shows a variant of this equipment. A tube coil 28 projects from above into a liquid tank 24 with a cylindrical shell 25, a bottom 26 and a cover 27. A rotor 30 arranged at the lower end of a tube 29 is coupled via a shaft 31 to a motor 32. A flame tube 33 leads obliquely into the tube 29 and is connected to a combustion chamber 9 in which a burner 35 is arranged. In this case also, the hot gases emerging from the flame tube 33 are thus drawn by the rotor 30 directly into the water contents W and set into turbulent motion, whereupon the gases purified in contact with the water or absorbent leave the tank through an upper opening 36. The liquid which is to be heated enters the tank 24 through an inlet 37 and leaves it through an outlet 38. A tube 39, similar to the tube 23 from FIG. 1, can be used for cooling the flame gas.

In order to obtain complete combustion, the burner flame F should not contact the absorbent liquid W or be struck by water droplets which are whirling up. Due to the strong centrifugal forces of the rotor 12 or 30 in the absorbent liquid, a higher residence time of the bubbles and hence also a reduction of the volume of the absorbent liquid W are obtained, still with the same good heat exchange and pollutant absorption. The flow rate of the flame gases can be controlled by a change in the dimensions (constriction) of the flame tube 9 (FIG. 1) and by adjusting the height of the rotor 12 or 30 as well as by the speed of rotation of the rotor.

According to FIG. 2, the lower section of the tube 29, marked 29a, can functionally be regarded as a prolongation of the flame tube 33. At the lower end of this section 29a, and also in the lower flamge tube section 9a according to FIG. 1, a net N which favors the distribution of the combustion gases in the liquid through fine pores can be fitted above or below the rotor 30 or 12.

In place of a rotor 12 or 30, it would also be possible to use a homogenizer or vibrator, or another element which would be capable of effecting the desired suction and the required turbulent motion.

The pollutants contained in the liquid can also be oxidized electrochemically or by means of a corona discharge, that is to say by providing electrodes within the liquid. Ozone can be used as the oxidizing agent.

In the embodiment according to FIG. 2, surface area-enlarging parts, for example Raschig rings R, can be incorporated in the transition piece between the burner 35 and the lower tube section 29a.

The motor can be arranged within the liquid W.

When the equipment is used as a flue gas scrubber, the hot flue gases are directed against the liquid through a tube provided in place of a burner and, as described, are drawn into the liquid and set in turbulent motion.

I claim:

1. An apparatus for direct heating of a liquid by hot gases avoiding the discharge of pollutants into the environment, comprising tank means containing a liquid with an absorbant, burner means having a burning chamber defined at least in part by an outer surface and situated above the liquid upper level, a hot-gas tube arranged within said tank means having a hot-gas inlet and a hot-gas outlet, the hot-gas inlet being connected to the burner means, and out-flow opening provided within the tank means for the hot-gases, at least the hot-gas outlet of the hot-gas tube dips into the liquid, and means is provided within the hot-gas tube for generating a suction effect directed into the liquid and for effecting turbulent motion of the hot-gases within the liquid, the apparatus further comprising precooling means for precooling the hot-gases, said precooling means having tube means for transferring the liquid to the burning chamber in order to continuously cool it by flowing the liquid along the outer surface of the burning chamber and preventing overheating of the gases present in said burning chamber.

2. An apparatus as claimed in claim 1, wherein the hot-gas tube is constructed as a flame tube of said burner means, said burner means adjusted according to the length of the flame tube in such a way that a resulting flame ends above the liquid level.

3. An apparatus as claimed in claim 1, wherein the said means is a rotor driven by drive means.

4. An apparatus as claimed in claim 3 wherein said rotor is connected to said drive means through a drive shaft, said drive shaft is surrounded by a tube and the flame tube leads to and is connected at an oblique angle to said tube surrounding the drive shaft.

5. An apparatus as claimed in claim 2, wherein the distance of the burner flame from the liquid surface is 5–20 cm.

6. An apparatus as claimed in claim 3 wherein said drive means is a motor.

7. An apparatus for direct heating of a liquid by hot-gases avoiding the discharge of pollutants into the environment, comprising tank means containing a liquid with an absorbant, burner means having a burning chamber defined at least in part by an outer surface and situated above the liquid upper level, a hot-gas tube arranged within said tank means having a hot-gas inlet and a hot-gas outlet, the hot-gas inlet being connected to the burner means, an outflow opening provided within the tank means for the hot-gases, at least the hot-gas outlet of the hot-gas tube dips into the liquid; and means is provided within a prolongated portion of the hot-gas tube for generating a suction effect directed into the liquid and for effecting turbulent motion of the hot-gases with the liquid, the apparatus further comprising precooling means for precooling the hot gases, said precooling means having the tube means for transferring the liquid to the burning chamber in order to continuously cool it by flowing the liquid along the outer surface of the burning chamber and preventing overheating of the gases present in said buring chamber.

8. An apparatus as claimed in claim 7 wherein the hot-gas tube is constructed as a flame tube of said burner means, said burner means adjusted according to the length of the flame tube in such a way that a resulting flame ends above the liquid level.

9. An apparatus as claimed in claim 7 wherein said means for generating a suction effect is a rotor driven by drive means.

10. An apparatus as claimed in claim 9 wherein said rotor is connected to said drive means through a drive shaft, is surrounded by a tube and the flame tube including its prolongated portion leads to and is connected at an oblique angle to said tube surrounding the drive shaft.

11. An apparatus as claimed in claim 8 wherein the distance of the burner flame from the liquid surface is 5–20 cm.

12. An apparatus as claimed in claim 9 wherein said drive means is a motor.

* * * * *